United States Patent [19]

Hoffman

[11] Patent Number: 4,976,798
[45] Date of Patent: Dec. 11, 1990

[54] METHOD OF APPLYING A PLASTIC WRAP TO A CONTOURED CONTAINER

[75] Inventor: Wolfgang W. Hoffman, Modesto, Calif.

[73] Assignee: Shibuya America Corporation, Modesto, Calif.

[21] Appl. No.: 464,319

[22] Filed: Jan. 12, 1990

[51] Int. Cl.⁵ .............................................. B32B 31/26
[52] U.S. Cl. ........................................ 156/85; 156/86; 156/293; 156/294; 156/218; 264/230; 264/342 R; 215/246; 53/442; 29/447
[58] Field of Search ...................... 156/85, 86, 93, 294, 156/218; 264/230, 342 R; 29/447; 53/442; 215/1 C, 246

[56] References Cited

U.S. PATENT DOCUMENTS

| | | | |
|---|---|---|---|
| 3,760,968 | 9/1973 | Amberg et al. | 156/86 |
| 3,959,065 | 5/1976 | Ashcroft | 156/86 |
| 4,016,706 | 4/1977 | Braker et al. | 156/86 |
| 4,416,714 | 11/1983 | Hoffmann | 156/86 |
| 4,661,188 | 4/1987 | Fumei | 156/86 |
| 4,911,772 | 3/1990 | Hoffmann | 156/85 |

Primary Examiner—Caleb Weston
Attorney, Agent, or Firm—Melvin R. Stidham

[57] ABSTRACT

The method of this invention includes the step of providing a mandrel sleeve shaped on the inside to fit over the small diameter end of a contoured container and being of an outer diameter substantially equal to the large diameter portion of the container. After applying a solvent of the plastic sheet material to the trailing edge of a length thereof, the sheet is wrapped around the container and the mantrel sleeve so that the trailing edge overlaps the leading edge and the solvent forms a firm bond between the overlapped edges. The mandrel sleeve is then withdrawn from the wrapped length, leaving it around the container, and the sheet material is heat shrunk to fit tightly over its full height around the contoured container. Before the sheet is wrapped around the mandrel and container, an adhesive, such as a hot melt glue, may be applied too that portion of the sheet that is wrapped in direct contact with the container.

10 Claims, 3 Drawing Sheets

METHOD OF APPLYING A PLASTIC WRAP TO A CONTOURED CONTAINER

BACKGROUND OF THE INVENTION

Others have applied a label or a protective covering of a plastic sheet material to a bottle, jar or other container by first forming a sleeve of the sheet material, and then sliding the sleeve over the container and heat shrinking it tightly around the container to conform to the contours thereof. This method is described and illustrated in Amberg et al, U.S. Pat. No. 3,767,496 for a "Method Of Making A Plastic-Covered Glass Container", and in related U.S. patents. However, in applying a label or a wrapper to containers in accordance with this method, it is necessary to perform the extra of first forming the cylindrical sleeve by wrapping it onto a separate mandrel or former, before it is even applied to the container.

The present inventor previously developed a method of forming the sleeve directly on the container itself, thereby omitting the step of sliding the sleeve onto the container before heat shrinking it tightly in place. Then, after the container is emptied, and is to be salvaged for recycling, the label is easily removed because the glue, which is applied to attach the label to the container, is weakened during heat shrinking. Specifically, the label is applied to the container by adhering it with glue on the leading edge, wrapping the label around the container and applying a solvent of the plastic label to the trailing edge so that when the trailing edge overlaps the leading edge, the solvent acts on both trailing and leading edges to bond them together. This bond is enhanced during heat shrinking. This method works very satisfactorily in practice, provided that the container has a cylindrical surface that is wide enough to hold the label in place until it is wrapped around the container and the overlapped edges are bonded together. However, there are many containers today that are of contoured configuration, with only a portion thereof that is of the maximum large cylindrical configuration. Where the cross-section is reduced, conventional rollers and brushes cannot press the label against the container to adhere it across its full height.

In an invention which is related to the present invention being described and claimed in my co-pending U.S. patent application Ser. No. 07/363,055 filed Jun. 6, 1989 for "Method of Applying a Thermoplastic Strip to a Container", now U.S. Pat. No. 4,911,772 dated, a heat shrinkable strip is applied to the large end of a container after pressing a cylindrical vacuum mandrel against that end of the container. The thermoplastic strip is wrapped around both the container and the mandrel to extend around reduced diameter portions of the container. After the strip is heat-shrunk around that end of the container to interlock therewith, the mandrel is withdrawn and the remainder of the strip is then heat-shrunk over the top of the container to form a tamper-evident seal.

OBJECTS OF THE INVENTION

It is an object of this invention to form a label sleeve of heat shrinkable material directly on a container, though only a portion of the container is of the maximum cylindrical configuration.

It is a further object of this invention to apply a heat shrinkable label directly on a container, only a portion of which is of large cylinder, while the remainder of the container is reduced in circumference or other peripheral configuration.

Other objects and advantages of this invention will become apparent from the description to follow, particularly when read in conjunction with the accompanying drawings.

SUMMARY OF THE INVENTION

In applying a full label or covering to a container, only a portion of which is cylindrical, I provide a mandrel in the form of a cylindrical sleeve with vaccum ports to grip a label as it is wrapped around the outer surface. The sleeve mandrel is of substantially the same outer diameter as the maximum diameter, cylindrical portion of the container, with an inner axial cavity to receive and accommodate the smaller portions of the container as, for example, the neck and lid of a bottle that is necked down to a small mouth. The sleeve mandrel is placed over the container with the cylindrical portion protruding, and a plastic label or covering material is wrapped around both the sleeve mandrel and the large diameter cylindrical portion of the body. Preferably, a suitable adhesive is applied just to that portion of the label that contacts the container, and the remainder of the plastic sheet is held in place on the sleeve mandrel by means of a vacuum. The overlapped trailing and leading edges are bonded together by a solvent of the plastic material and, after bonding, the mandrel is withdrawn from the label sleeve so formed. The label sleeve is then heat shrunk around the smaller container portions within. In some instances, the lower portion of the container may be of reduced size. In such case, the lower portion of the container is positioned in a sleeve mandrel that opens upwardly, prior to wrapping the label around the sleeve and container.

BRIEF DESCRIPTION OF THE DRAWINGS

In the drawings:

FIG. 3 is a schematic section view showing the upper portion of the label heat shrunk onto the smaller top and lid of the container;

DESCRIPTION OF PREFERRED EMBODIMENTS

Figure 1:
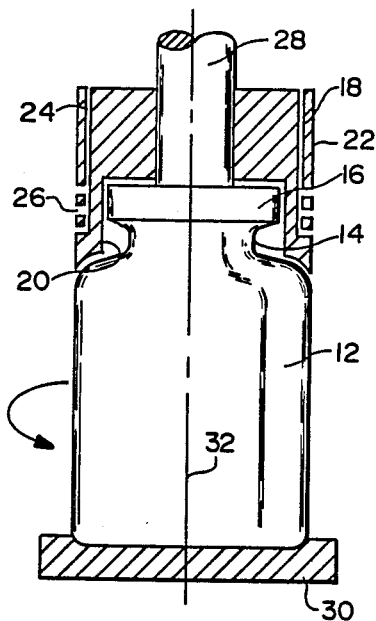
FIG. 1, 2, and 3 are schematic section views showing a container on a rotating bottom chuck and partially surrounded by a sleeve mandrel as a plastic label is applied thereto.

The Embodiment of FIGS. 1 to 4

In this embodiment, there is shown a method of applying at high speed, a combined label and tamper evident seal 10 to a container 12, which has a relatively large diameter body that is necked down at 14 and closed with a cap or lid 16. There is provided a sleeve mandrel 18 with an interior 20 large enough to receive the neck 14 and cap 16 of the container, and with an outer surface of a diameter substantially equal to that of the container body 12. A series of vacuum passages 24, which extend parallel to the axis of the sleeve mandrel 18, terminate in radial ports 26 to hold a label 10 in place as it is wrapped around the sleeve mandrel. A coaxial hold down rod 28, which is extendable axially in the sleeve 18, engages the top of the container 12 to hold it steady as it spins with the bottom chuck 30. The sleeve 18, the hold down rod 28 and the bottom chuck 30, on which the container is positioned and supported, all rotate as a unit on their axis 32, while they revolve around in customary fashion on a carousel conveyor (not shown), as the label 10 is being applied.

Figure 2:
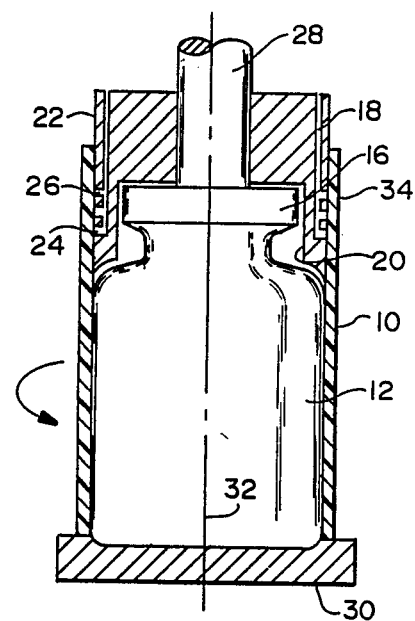

As shown in FIGS. 1 and 2, a length of plastic label material 10 is applied to both the capped container 10 and the mandrel sleeve 18 and, as the mandrel sleeve 18 and chuck 30 spin the container 12 about its axis 32, the label 10 is wrapped around the container 12 and held to the mandrel sleeve 18 by vacuum exposed through the radial ports 26.

Figure 4:
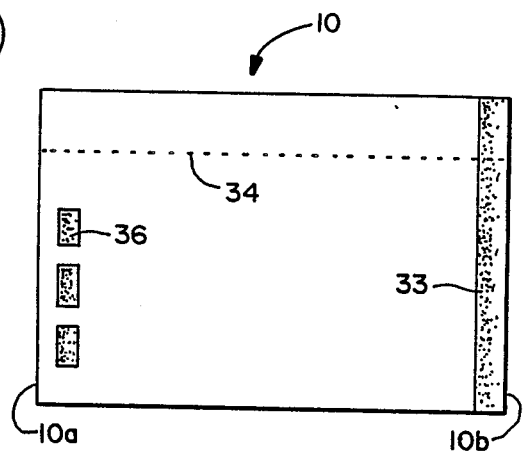
FIG. 4 is a plan view of a label with glue applied along a portion of the leading edge, and a solvent applied along the full width of the trailing edge.
Figure 5:
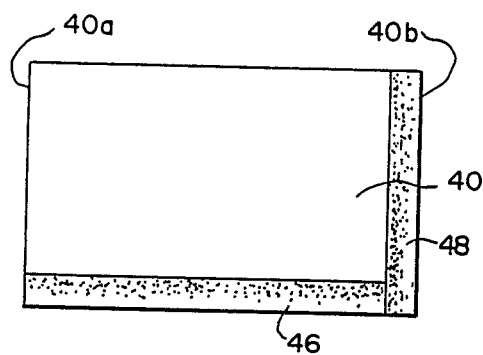
FIG. 5 shows another label wherein a glue strip is formed along a lower edge of the label and a solvent is applied along the trailing edge of the label.
Figure 6:
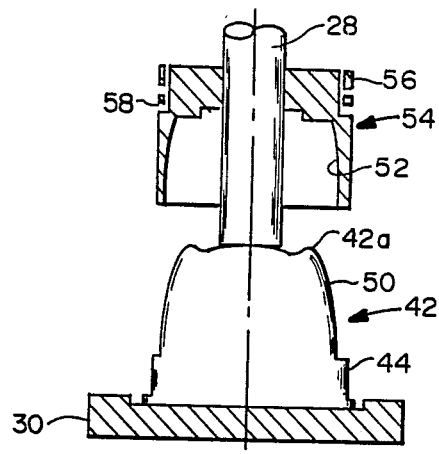
FIG. 6 shows the placement of a contoured container upside down on a rotating chuck with an inverted former sleeve above it.
Figure 7:
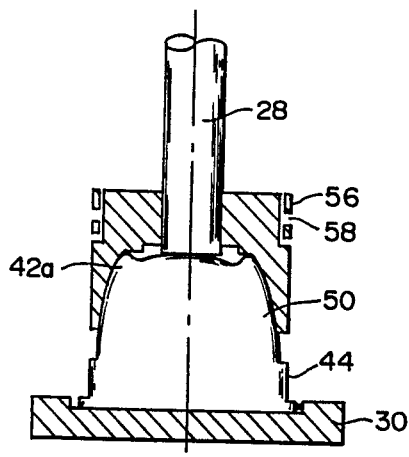
FIG. 7 is a section view showing the positioning of the former sleeve prior to applying the label.
Figure 8:
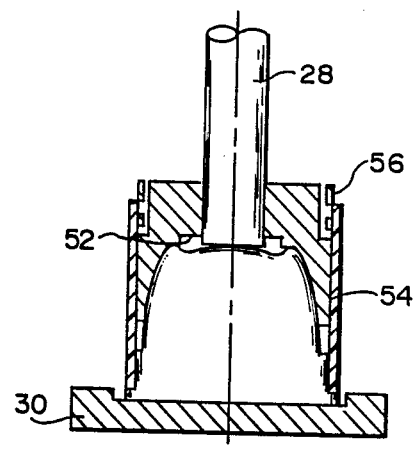
FIGS. 8 and 9 show the method of forming the sleeve around the container and former together.

Prior to or during application of the label 10 to the container 12, a solvent of the plastic material from which the label is made is applied in a narrow strip 33 along the trailing edge 10b (FIG. 4). Then, when the label 10 wrapped around the container 12 and the trailing edge 10b overlaps the leading edge 10a, the liquid solvent acts on the plastic material at the leading edge 10a so that, as the solvent dries, it forms a firm bond between the overlapped edges 10a, 10b of the label. Hence, a sleeve is formed around both the mandrel sleeve 18 and the container 12 itself.

Figure 3:
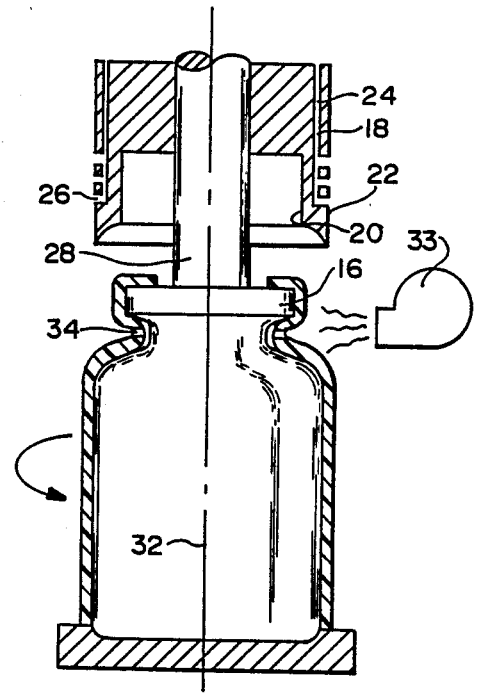

After the overlapped edges 10a and 10b of the label are bonded together, the sleeve mandrel 18 is withdrawn from the plastic sleeve 10 so formed, as shown in FIG. 3, and heat is applied to the upper portions of the plastic label sleeve by suitable means 33, causing it to shrink snugly around both the bottle 12 and the cap 16, and over the top of the cap 16 to encase it firmly. Prior to application, a tear strip or perforation 34 is formed along the length of the tamper evident label at a level below the portion that surrounds the cap 16 so that, when the label is severed along the tear strip 34, the cap 16 is easily removed. By the same token, once the label is severed, it is readily apparent even though the cap 16 may be replaced, that the container 12 has been opened. Hence, the label 10 itself functions as a tamper-evident seal for the cap 16.

In high speed production, the label 10 may be severed from a roll and preferably, a strip or spots of a suitable adhesive, such as a hot melt glue, is applied to the leading edge of the label in those portions of the label 10 which are applied to the container 12 below the sleeve mandrel 18. Obviously, one would not want to apply glue to the mandrel itself, so glue is applied to adhere the label 10 to the container 12, and the vacuum ports 26 cause the label 10 to cling to the sleeve mandrel 18 until the label sleeve is formed.

The Embodiment of FIGS. 5 to 10

In this embodiment, a heat-shrinkable label 40 is applied to a contoured, cuplike container 42, as for precooked foods, jellies or the like. As in the previous embodiment, the label 10 is cut to a length enabling it to be wrapped around the major, cylindrical portion 44 of the container 42, with the leading and trailing edges 40a and 40b overlapped. Preferably, a suitable adhesive, such as a hot melt glue is applied in a strip 46 along the lower edge of the label, where it will be applied in contact with the inverted container 42. A solvent of the plastic material of the label is applied in a narrow strip 48 along the trailing edge 40b, where it overlaps the leading edge 40a.

The container 42, which may be filled and capped, is positioned on the rotating chuck 30 inverted, so the smaller, tapered portion 50 of the container 42 extends upwardly. The interior 52 of the mandrel sleeve 54 is formed to receive and accommodate the tapered portion 50 of the container 42, and the outer surface 56 of the mandrel sleeve 54 is cylindrical and of a diameter substantially equal to that of the large diameter upper portion 44 of the container, which in its inverted position, extends below the mandrel sleeve 54. With the container 42 positioned on the rotating chuck 30, the sleeve 54 is lowered to the position shown in FIGS. 7 and 8, and the heat shrinkable label 40 is wrapped around both the container 42 and the sleeve 54. Upon application to the container 42, the label is adhered to the container 42 by the hot melt adhesive 46 along the bottom of the label, while clinging to and around the mandrel sleeve 54 by exposure to the vacuum through the ports 58.

Figure 9:
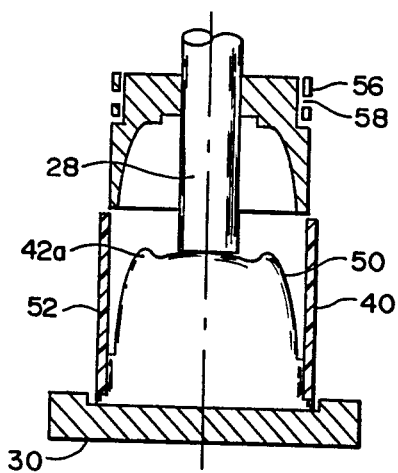
Figure 10:
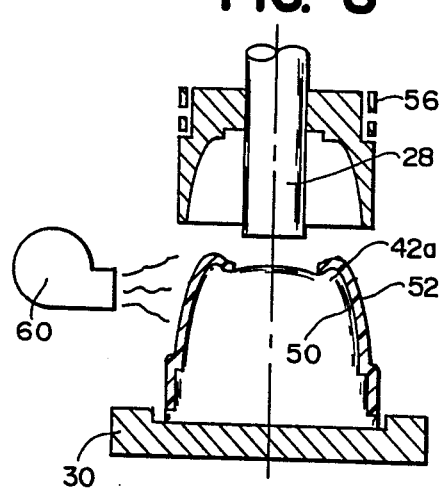
FIG. 10 shows a section view showing the label heat shrunk onto the container after the former sleeve is withdrawn.

Then, after the label 40 is so formed into a cylindrical sleeve encircling the container 42, and the overlapped edges 40a and 40b are firmly bonded together, the sleeve mandrel 54 is withdrawn, as shown in FIG. 9, and heat is applied by suitable means 60 to the upper portions of the label, causing the label to fit snugly around the contoured container 42 and, if desired, around the bottom lips 42a thereof to form a neat, tight fitting label, as shown in FIG. 10.

Figure 11:
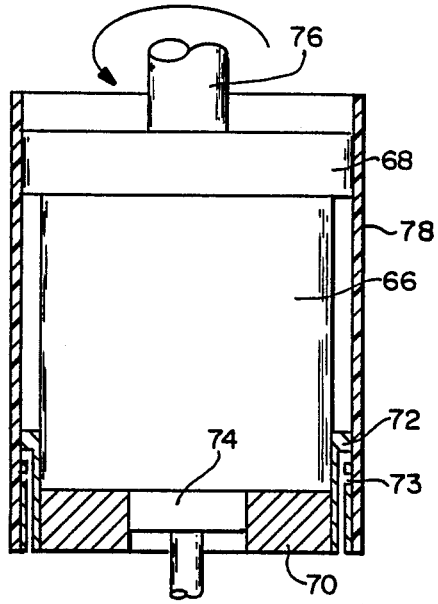
FIG. 11 is a schematic section view of a container on a cup-like bottom chuck forming a sleeve mandrel as a plastic label is applied to a container, the bottom portion of which is smaller in periphery.
Figure 12:
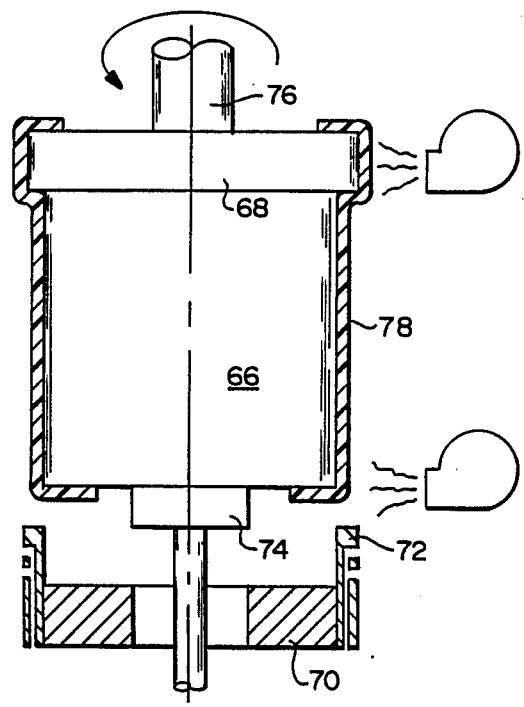
FIG. 12 shows the label prior to and after heat-shrinking onto the container.

The Embodiment of FIGS. 11 and 12

There are certain containers wherein the top portion or lid is larger than the bottom portion. This may occur, for example, in cylindrical or conical ice cream containers 66 with a lid 68 of greater diameter. In many such cases, a label cannot properly be applied by wrapping it directly onto the container and lid 66, 68. Also, it may not be feasible to invert the container prior to the labeling as in the embodiment of FIGS. 5 to 10. Accordingly, the bottom chuck 70 is formed of cuplike configuration having an integral sleeve mandrel 72. The container 66 is introduced to the rotating chuck by inserting it from the side onto a raised lift or elevator 74 in the position shown in FIG. 12. A hold down plunger 76 is lowered against the top 68 of the container 66 to press the container into the sleeve mandrel 72 as the elevator 74 descends.

A spot of glue is supplied to the leading edge of the label 78 in the area wherein it is brought into contact with the container lid 68, and then the label is 78 wrapped around both the container 66 and sleeve 72 to which the label clings by reason of a vaccum at ports 73. The overlapped leading and trailing edges of the label 78 are bonded together by a solvent of the plastic material of the label 78, as described in conjunction with previous embodiments. After the overlapped edges are so bonded, the lift 74 is elevated to lift the container 66 free of the sleeve mandrel 72 and heat is applied to shrink the label 78 snugly around the container 66 and lid 68 and over the top thereof, as shown in FIG. 12.

Figure 13:
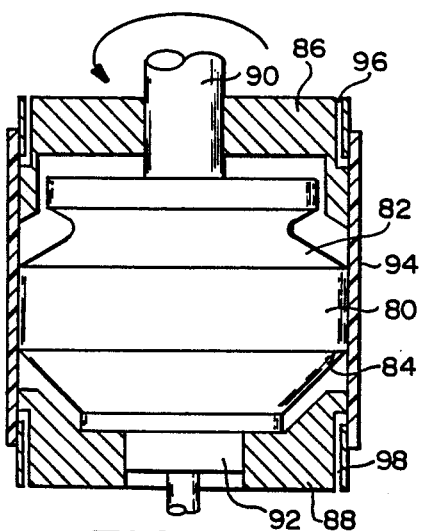
FIG. 13 is a schematic section view showing a container that is contoured at both top and bottom to receive a pair of sleeve mandrels on which a plastic label is wrapped.
Figure 14:
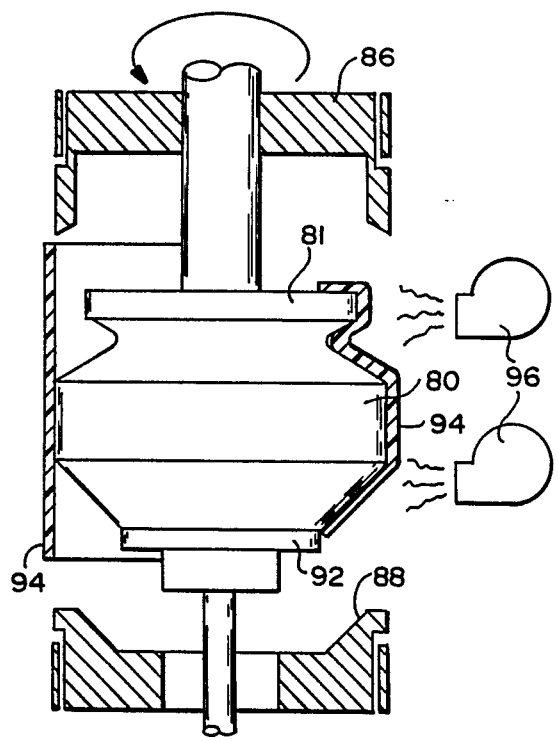
FIG. 14 shows the container of FIG. 13 with a label prior to, and after, heat-shrinking it thereon.

The Embodiment of FIGS. 13 and 14

As shown in FIGS. 13 and 14, certain containers 80 may be contoured at both top 82 and bottom 84. For such containers, there may be provided two sleeve mandrels 86 and 88, one for the top of the container and one for the lower end. Also provided are a hold down plunger 90 at the top and a container lift or elevator 92 at the bottom to lower the container 80 into the bottom chuck 88 and to lift it free thereof.

The container 80 is introduced onto the elevator 92 and then lowered into the rotating chuck 88. A short strip of glue is applied to the leading edge of the label 94 where it is brought into contact with container 80, so as to adhere the label thereto. Then the label is wrapped around the container 80, as well as the upper and lower sleeve mandrel chucks 86 and 88, as all three spin together. The label 97 clings to the sleeve mandrels 86 and 88 by reason of vacuum ducts 96 and 98 in the upper and lower sleeve mandrels. Thereafter, the container 80 is raised by the elevator 92 free of the bottom chuck 88 and the top chuck 86 is raised to clear the label sleeve 94 so formed, a shown at the left in FIG. 14. Thereafter, the label is heat shrunk at 96 on and around the container 80, as well as the lid 81, to the condition shown at the right in FIG. 14.

While this invention has been described in conjunction with preferred embodiments thereof, it is obvious that modifications and changes therein may be made by those skilled in the art to which it pertains without departing from the spirit and scope of this invention, as defined by the claims appended hereto.

What is claimed as invention is:

1. The method of applying a wrap of a plastic sheet material to a contoured container of a small diameter at one end increasing to a relatively large diameter cylindrical portion spaced from said one end comprising the steps of:
   providing a mandrel sleeve with an inner surface of a size and shape to be received over said one end of the container to a level close to said large diameter portion and a cylindrical outer surface of said large diameter portion;
   there being a plurality of vacuum passageways in the wall of said mandrel sleeve opening on the cylindrical surface thereof;
   positioning said container on a rotatable chuck with said one end up;
   lowering said mandrel sleeve over said one end of the container;
   cutting a length of heat shrinkable sheet material long enough to encircle said large diameter portion with overlapped edges;
   applying a solvent of said plastic sheet material to the trailing edge of said length;
   wrapping said length of said sheet material around both said sleeve and the large diameter portion of said container so that the trailing edge overlaps the leading edge thereof;
   withdrawing said mandrel sleeve from within said wrapped length; and
   applying heat to said length of sheet material to shrink it tightly around said container.

2. The method of applying a wrap of a plastic sheet material to a contoured container defined by claim 1 including the step of:
   before wrapping said length of sheet material applying an adhesive to the area thereof to contact said large diameter portion of the container.

3. The method defined by claim 2 wherein:
   said adhesive is applied to the leading edge of said label.

4. The method defined by claim 2 wherein:
   said adhesive is applied along at least a portion of the length of said plastic sheet material.

5. The method of applying a wrap of a plastic sheet material to a contoured container with a small periphery portion at one end increasing to a relatively large diameter cylindrical portion spaced from said one end comprising the steps of:
   providing a mandrel sleeve with an inner surface of a size and shape to be received over said one end of the container to a level close to said large diameter portion and a cylindrical outer surface of said large diameter portion;
   there being a plurality of vacuum passageways in the wall of said mandrel sleeve opening on the cylindrical surface thereof;
   positioning said container in said mandral sleeve with said mandrel sleeve over said one end of the container;
   cutting a length of heat shrinkable sheet material long enough to encircle said large diameter portion with overlapped edges;
   applying a solvent of said plastic sheet material to the trailing edge of said length;
   wrapping said length of said sheet material around both said sleeve and the large diameter portion of said container so that the trailing edge overlaps the leading edge thereof;
   withdrawing said mandrel sleeve from within said wrapped length; and
   applying heat to said length of sheet material to shrink it tightly around said container.

6. The method of applying a wrap of a plastic sheet material to a contoured container defined by claim 5 including the step of:
   spinning said mandrel sleeve with said container to wrap said length of sheet material.

7. The method defined by claim 5 wherein:
   said small periphery portion of the container is at the upper end thereof and said container is supported on a relatively flat chuck with said sleeve mandrel lowered over said upper end thereof.

8. The method defined by claim 5 wherein:
   said small periphery portion of the container is at the lower end thereof and said mandrel sleeve is formed as a cup to support said container.

9. The method defined by claim 8 wherein:
   there is provided a lift within said mandrel sleeve to be raised for insertion and removal of a container and lowered while wrapping said length of sheet material.

10. The method defined by claim 5 wherein:
    said relatively large diameter cylindrical portion is intermediate the ends of said container and a first mandrel sleeve is formed as a cup to receive and support said container and a second mandrel sleeve is lowered over the upper end of said container.

* * * * *